April 26, 1949. G. A. AUER 2,468,389
MECHANICAL MIXER
Original Filed July 31, 1943 4 Sheets-Sheet 3

INVENTOR.
George A. Auer
BY
Atty's

April 26, 1949.   G. A. AUER   2,468,389
MECHANICAL MIXER

Original Filed July 31, 1943   4 Sheets-Sheet 4

INVENTOR.
George A. Auer
BY
Attys.

Patented Apr. 26, 1949

2,468,389

UNITED STATES PATENT OFFICE 2,468,389

MECHANICAL MIXER

George A. Auer, Chicago, Ill.

Original application July 31, 1943, Serial No. 496,920. Divided and this application November 14, 1945, Serial No. 628,463

5 Claims. (Cl. 259—8)

The invention is concerned with improvements in a mechanical mixer of the colloid mill type, as shown, for example, in the U. S. Patent No. 2,391,858, of which the present application is a division.

Figure 1:
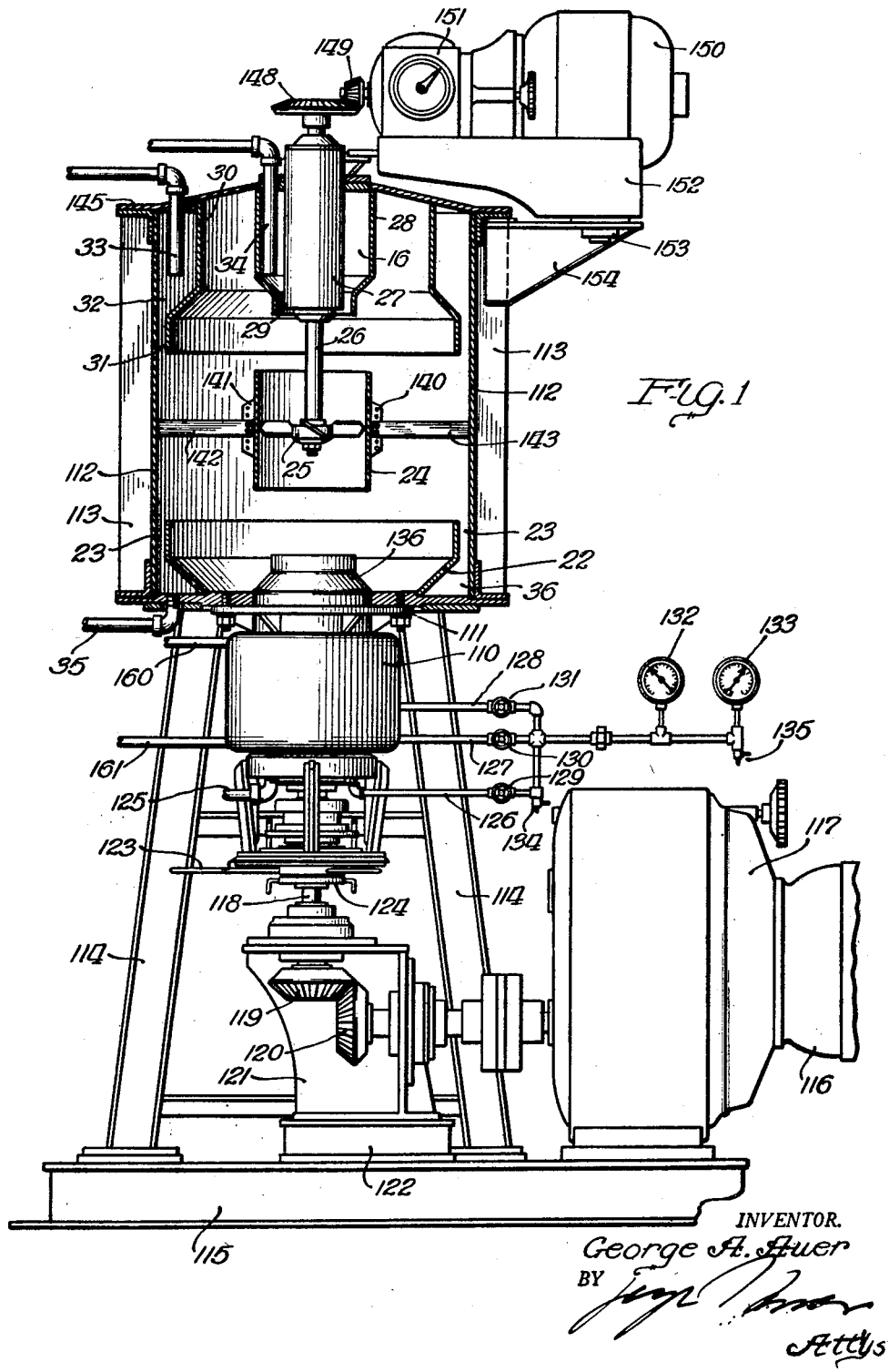
Figure 2:
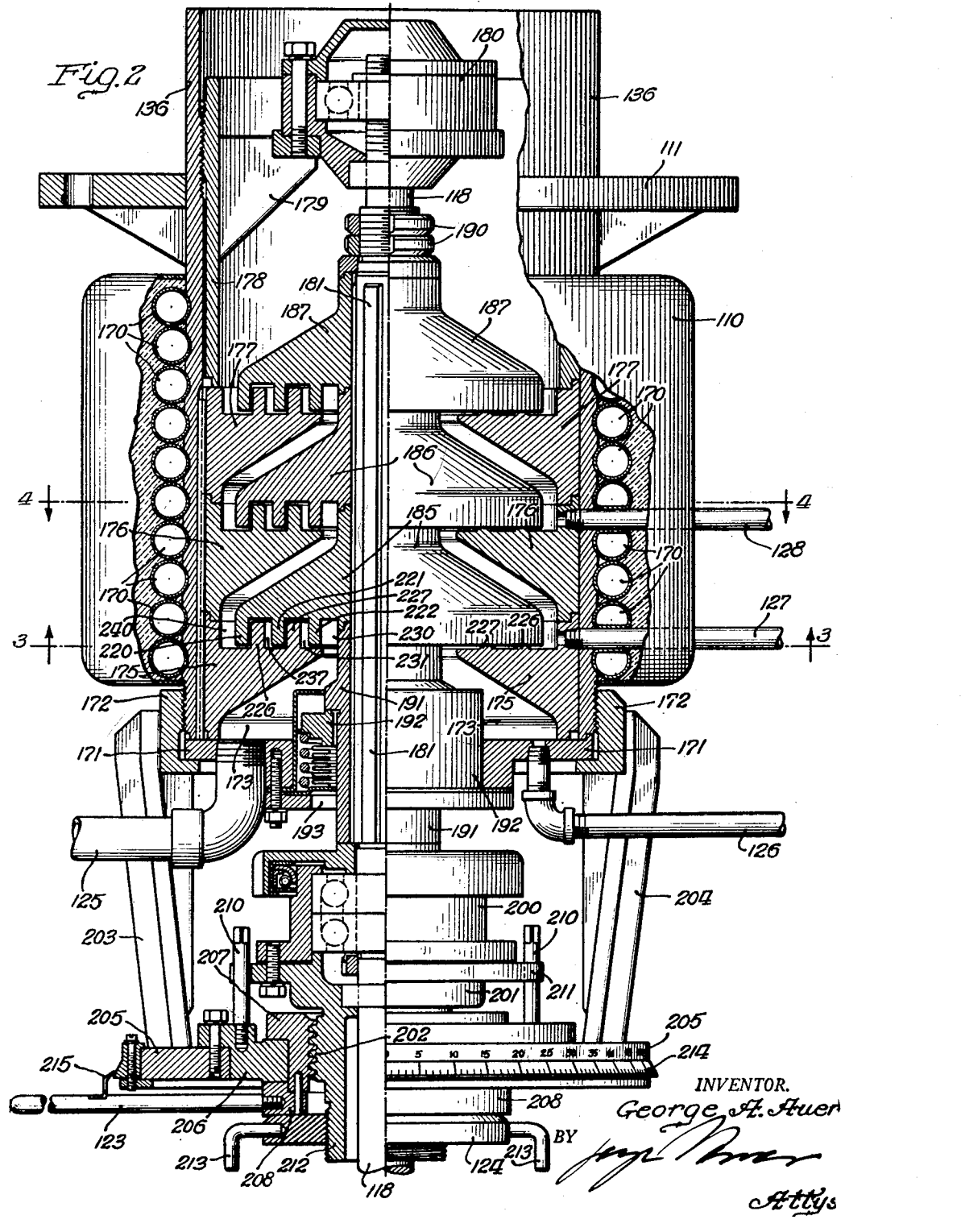
Figure 3:
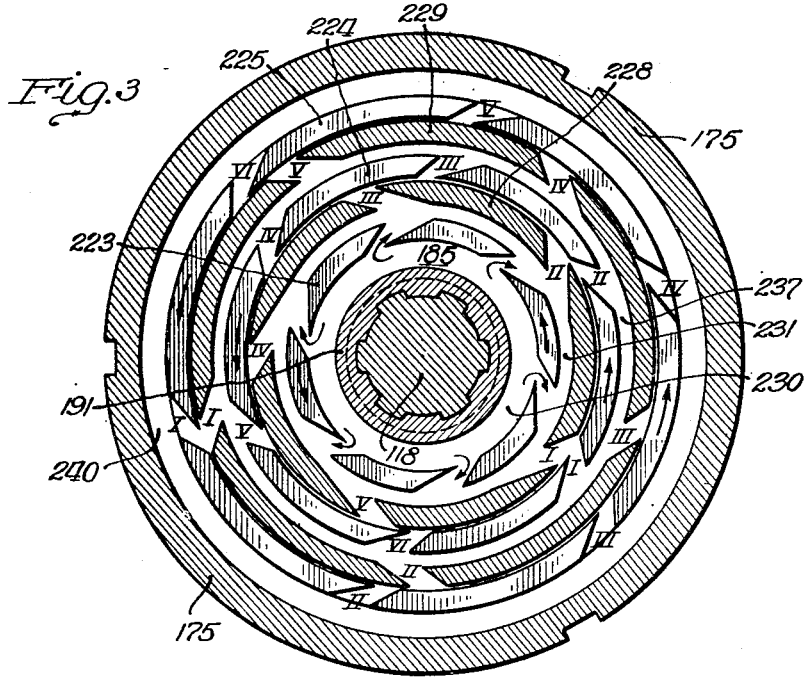
Figure 4:
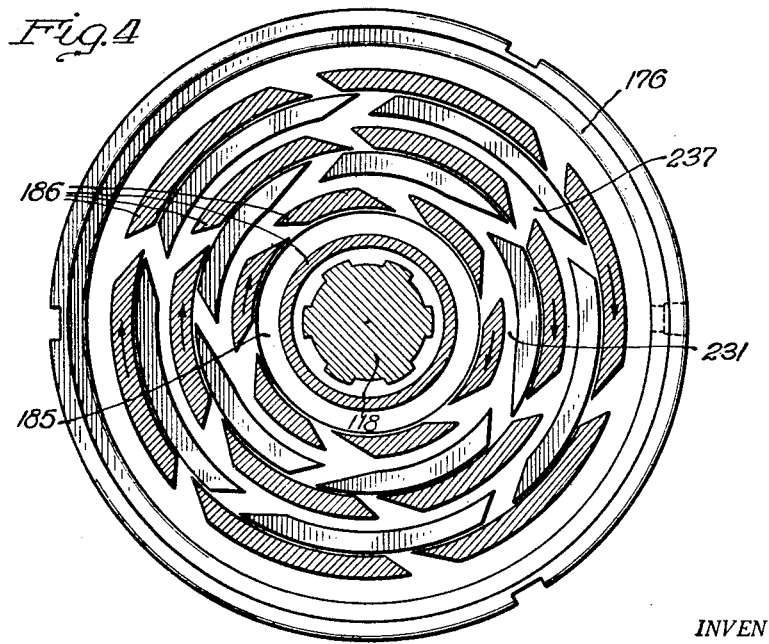

The various objects and features of the invention will appear from the detailed description which is rendered below with reference to the accompanying drawings. In these drawings, Fig. 1 shows a processing machine partially in section, in which the mechanical mixer may be used;

Fig. 2 illustrates the mechanical mixer of Fig. 1 on an enlarged scale and partially in section;

Figs. 3 and 4 are sectional views taken along lines 3—3 and 4—4 in Fig. 2; and

Figure 5:
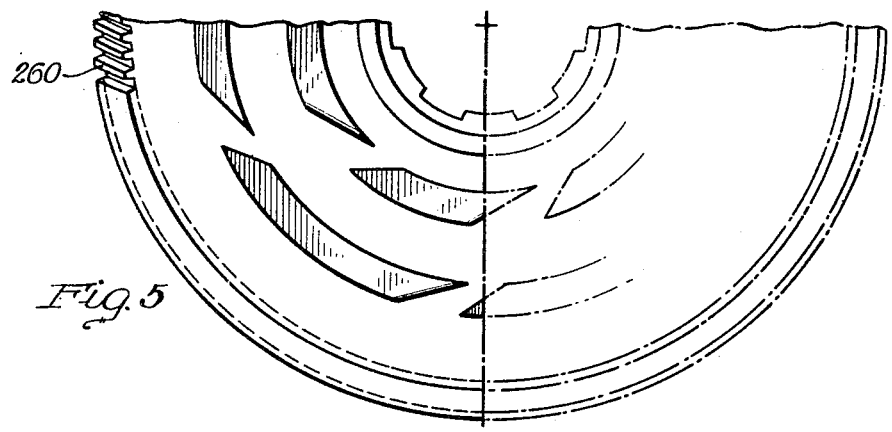
Figure 6:
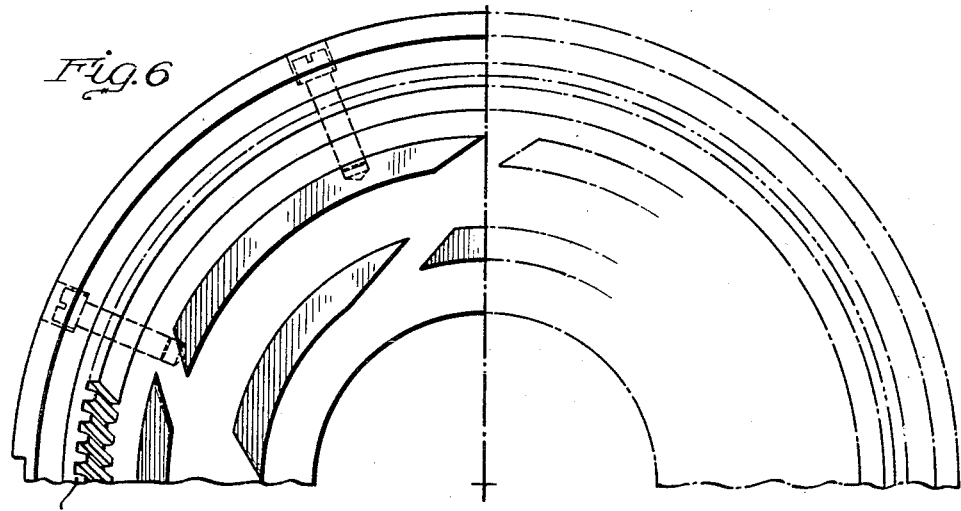
Figure 7:
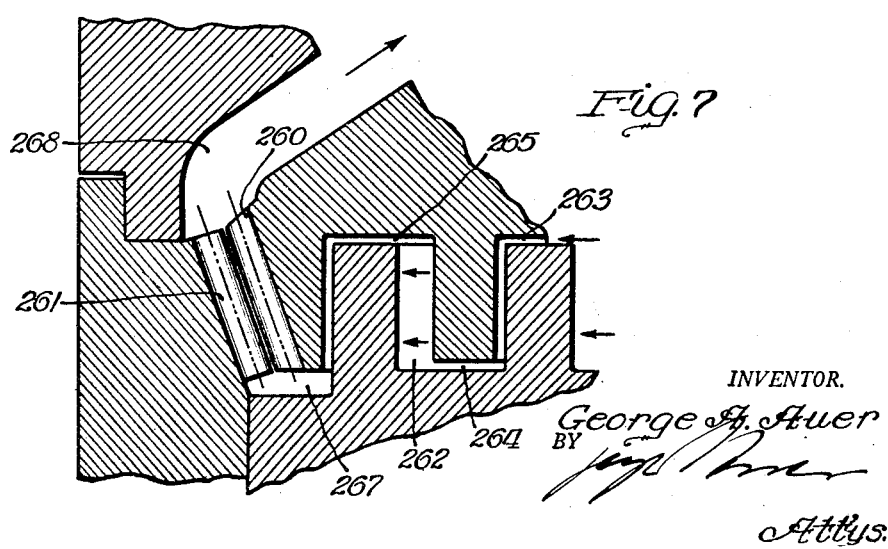

Figs. 5, 6 and 7 illustrate details of a modified mixer element.

The machine shown in Fig. 1 comprises a mechanical mixer indicated by numeral 110. The mixer is built as a unit and is attached by means of a flange 111 to the bottom of the tank 112 which is reinforced by means of vertically extending ribs 113. The machine is provided with legs or standards 114 and is mounted on a base 115. Also mounted on this base is the motor 116 with its speed control device 117. The motor operates the shaft 118 through suitable gears 119—120 which may be bevel gears or spiral gears as desired or necessary. The gears are secured in a mounting 121 attached to the base 115 at 122.

The mixer is of the turbine mixer type and is provided with a number of stators and coacting rotors, the latter being removably mounted in splined connection with and on the shaft 118. The space between the rotor and stator faces is adjustable within certain limits by means of a hand lever 123 and can be fixed in any adjusted position by means of the member 124. For this purpose the shaft 118 is in splined connection with gear 119.

The material to be processed may be fed to the mechanical mixer 110 at 125. The lines 126—127—128 connect with various critical points within the mixer 110 and with valves 129—130—131 for selectively connecting these points with the pressure gage 132 and with the temperature gage 133 so as to measure and to check the pressure and the temperature conditions at these points during the operation of the machine. Drain valves for facilitating the checking and measuring operation are indicated at 134—135. These valves may also be employed as sampling valves.

The mechanical mixer is mounted in such a manner that its upper cylindrical outlet portion 136 projects through the bottom of the upper tank 112 and part way into the tank. At the bottom of the tank 112 is mounted an insert or baffle 22 forming the annular chamber 36 which is flooded by fluid through the annular passage 23.

At a central point of the tank 112 is mounted the cylindrical insert 24 which is provided with ears 140—141 for attachment to brackets 142—143 secured to the inside wall of the tank 112. The provision of the ears 140—141 permits vertical adjustment of the insert or baffle 24 within the tank.

The cover or lid 145 is centrally provided with the journal member 27 for the shaft 26 which carries the propeller 25. The propeller or agitator may be of a type provided for adjustment of the pitch of the blades. The shaft 26 also carries a suitable gear 148 which meshes with gear 149, and the latter is operated by a motor 150 provided with an adjustable speed control 151. Bevel gears are shown, but any suitable type of gears, for example, spiral gears or the like, may be used. The motor 150 with its speed control 151 is secured to a mounting 152 which is rotatable in a journal 153, and the latter is secured to a bracket 154 carried by the tank 112. It is thus possible to swing the motor with its speed control and gear 149 out of position away from the tank when it is desired to remove the tank cover to gain entrance into the interior. Suitable means are provided for locking the motor assembly in operating position with the gear 149 meshing with gear 148.

Depending from the tank cover 145 is the circular baffle or insert 28 forming the annular central passage 29. This passage 29 communicates with the suction chamber 16 in which is disposed the suction line 34, and the latter is connected with suitable valves for controlling the withdrawal of material from the chamber 16. Also depending from the cover 145 is the circular insert or baffle 30 forming the annular peripheral passage 31 which communicates with the suction chamber 32. The latter is equipped with a suction line 33 which connects with suitable valves for controlling the withdrawal of material from the chamber 32.

The sloping walls of the inserts 28 and 30 may be placed differently upwardly or downwardly as desired. It should be noted that the diameters of the inlet 136 coming from the mechanical mixer 110 and of the annular passage 29 of the suction chamber 16 are less than the diameter of the insert 24 disposed centrally of the upper tank 112, and that these elements are symmetrically arranged with respect to the insert 24.

Control devices such as a float, vent valve, gas outlet, pressure gage and the like, and also a man-hole or hand-hole may be provided wherever desired or necessary. In addition, if desired, provision may be made for a sight opening either in the tank cover or at any other convenient point of the tank, and auxiliary devices such as level gages and the like may also be provided as desired.

The material to be processed is introduced into the mechanical mixer at 125. The mixer may also be provided with a heating or cooling jacket to be employed as desired, and the latter may be supplied with heating or cooling fluid by way of the lines 160—161. The material stream is successively processed in a controlled manner within the mechanical mixer and is discharged upwardly into the tank 112. As the liquid rises within the tank 112 it floods first the chamber 36 through the annular passage 23. When the liquid level rises upwardly beyond the agitator 25, the motor 150 may be started to circulate the liquid within the tank 112 centrally axially upwardly, then radially outwardly and peripherally downwardly, and then radially inwardly again, for intermixture with the material stream issuing from the mechanical mixer 110 by way of the outlet 136. When the liquid reaches near the top level, it floods the chambers 16 and 32 through the annular passages 29 and 31. The agitator 25 in such operation of the machine has primarily a flow control function. Whatever mixing action will result is incidental. There may, of course, be occasion for adjusting the pitch of the blades of the agitator 25 and rotating it at such speed as to provide for a desired degree of turbulence within the tank 112. Such operation may be carried out, for example, when the tank 112, which constitutes a hydraulic control device, is initially used as a rough mixer. The mixing may also be accomplished mainly within the tank 112, the mechanical mixer furnishing the supply and circulation of the material. Rough mixing with the agitator 25 adjusted so as to furnish agitating rough turbulence may be followed by fine controlled processing within the tank 112, with the agitator functioning as a flow control element. It should be observed that the passages 29, 31, 23 are symmetrically disposed in the tank chamber to assist the desired hydraulic circulating flow of the liquid material, as described before.

The mechanical mixer used in the machine shown in Fig. 1 is shown on a larger scale in Fig. 2. It comprises the tubular shell 136 carrying the flange 111 for attachment to the bottom of the tank, as shown in Fig. 1. The upper end of the shell 136 is shown cylindrical in Fig. 2, but may be shaped as indicated in Fig. 1, or may be provided with a suitable attachment. The shell carries coils 170 covered by an insulating jacket, the coils connected with the lines 160—161 shown in Fig. 1 for circulating heating or cooling fluid as may be required. A coil is shown for the sake of convenience, but the heating or cooling provisions, respectively, may be different. A member 171 forms the bottom for the shell 136 and is attached thereto by means of bushing 172. Secured to the bottom 171 is the material inlet 125 which empties into the inlet chamber 173. The pipe 126 is connected by a suitable coupling to the bottom member 171, as shown, so as to permit withdrawal of liquid from the inlet chamber 173 during the operation of the machine, through the valve 129 to the pressure and temperature gages 132—133 shown in Fig. 1.

Stators 175—176—177 are mounted within the tubular shell 136 by means of the tubular member 178. This member carries brackets 179 to which is secured the upper bearing 180. The upper end of the shaft 118 is journalled in this bearing 180 in splined connection therewith. The shaft is splined as indicated as 181 for the removable attachment thereto of the rotors 185—186—187 which are secured by nuts 190. If it is desired to use only one or two of these rotors instead of all three, the rotor or rotors to be eliminated are, in each instance removed and suitable sleeves are in each instance inserted in their place. A sleeve 191 is keyed to the shaft 181 at the lower end thereof. This sleeve 191 coacts with the shell 192. The assembly is closed at the bottom by means of the plate 193, the shell 192 providing a pressure-tight connection. The shaft 118 with its rotors 185—187 is thus vertically movable within the structure.

Attached to the shaft 118 at its lower end adjacent the sleeve 191 is the bearing 200. This bearing is secured to an adjusting member 201 which is provided with a tubular sleeve carrying a thread 202. Arms 203—204 are secured at their upper ends to the bushing member 172 and at their lower ends carry a ring 205. Attached to this ring is the member 206, and rotatably secured with respect thereto is the ring 208 by means of which a nut 207 can be rotated, this nut being in threaded engagement with the thread 202 carried by the member 201. The ring 208 may be rotated by means of the lever 123 to displace axially the member 201 by means of thread 202 thereby likewise displacing the shaft with its bearing 200 and its rotors 185—187. The members 210 are guide pins for the upper plate 211 of the adjusting member 201 and prevent rotation of the bearings during rotation of the ring 208. The parts may be secured in adjusted position by means of the locking member 124 which is in threaded engagement with the tubular sleeve 212 depending from the adjusting member 201. The ring 124 may be operated by levers 213. The inclined surface 214 on the fixed ring 205 is provided with index marks for coaction with the index finger 215 which is attached to the lever 123. The adjustment provided for in this particular machine takes care of moving the rotors with respect to the stators from a close position of a few microns up to a maximum distance of about ¼".

The stators carry a plurality of annular axially extending rings, and the rotors carry coacting annular rings which interlace with the stator rings. The stator as well as the rotor rings are tangentially slotted in a manner to be presently described, so as to provide a laterally outwardly effective propulsion and mixing force for the liquid material to be processed. Such rotor-stator structures are broadly known. Improvements in details of this particular structure will now be described jointly to Figs. 2, 3 and 4.

Fig. 3 is a section through the first turbine mixer stage formed by stator 175 and rotor 185 taken along lines 3—3 in Fig. 2, looking upwardly at the rotor 185. The rotor is splined to the shaft 118 above the sleeve 191 which is shown in section. The rotor is provided with three annular rings 220—221—222 (see Fig. 2), each ring being tangentially slotted in the manner shown in Fig. 3, to provide blades or sectors indicated by the numerals 223—224—225, these blades being shown in elevation and vertically shaded. The number of blades or sectors in each annular rotor ring is alike. In this case each ring carries six blades or sectors such as 223—224—225, the tangential slots between adjacent blades in blade rings 224—225 being marked by numerals I-VI.

The stator 175, as shown in Fig. 2, carries two annular rings 226 and 227. These annular rings are likewise tangentially slotted as indicated in Fig. 3, to provide stationary blades or sectors indicated by numerals 228-229 shown in section and diagonally cross-hatched. The stator rings 226—227 are slotted in such a manner as to carry equal numbers of blades such as 228—229, and in this case there are formed in each stator ring five blades. The tangential slots between the stator blades in each ring form stationary gates marked by I-V.

The direction of rotation of the rotor blades is indicated in Fig. 3 by arrows. The shell 136 in which the mechanism is mounted is omitted in Fig. 3.

The liquid material is introduced for processing through the pipe 125 into the inner chamber 173 shown in Fig. 2. It may be stated at this point that this chamber may be enlarged if desired, and that separate blades may be attached to the rotor shaft so as to propel the liquid through the upwardly and inwardly sloping space of the chamber 173 in the direction of the interlacing rotor stator faces of the first mixing stage formed by the stator 175 and the rotor 185. The liquid emerges upwardly (perpendicularly to the plane of the drawing as seen in Fig. 3) in the annular space marked in Figs. 2 and 3 by numeral 230. The liquid is scooped up by the six innermost blades 223 of the rotor blade ring 222 which act in the manner of an impeller disposed at the top of chamber 173, drawing liquid from the chamber, and the liquid is then propelled radially outwardly into the annular space 231 which connects with the inside face of the innermost stator blade ring 227 forming the stationary blades 228 and the inner gates I-V indicated in Fig. 3. Each mixing stage is thus provided with its own impeller which controls transfer of the liquid from the inlet to and through the corresponding processing level or stage. Escape of the liquid from chamber 231 is possible only over definite channels. The arrangement provides for escape of liquid successively through the gates I-V of the stator blade rings 228.

Assuming, for example, that the mechanism is in the position shown in Fig. 3, it will be seen that liquid is scooped up by the tips of the innermost rotor blade rings 223 in the manner indicated by the arrows. Now, following circularly around the space 231 in back of the blade rings 223 in the direction of rotation of the rotor, it will be seen that the liquid has no chance to escape laterally from the space 231 except through the stationary gate space I between the stator blades 228 which is now aligned with the rotatable gate space I between the rotor blades of blade ring 224. The liquid thus enters the second chamber 237 of the rotor-stator assembly. The next escape of liquid from chamber 231 into chamber 237 will be upon alignment of the movable gate II between the rotor blades 224 with the stationary gate space II of the stator blades 228.

In short, the liquid escapes from chamber 231 into chamber 237 successively by successive alignment, in the direction of rotation of the rotor, of the rotor gates I-VI with the stator gates I-V. The five stator gates I-V eject liquid successively in numerical order during each revolution of the rotor.

Following the chamber 231 annularly around in the direction of rotation of the rotor, as shown in Fig. 3, it will be seen that the liquid can escape laterally from this chamber in the assumed initial position of the mechanism only through the gate space I of the outermost stator blades 229, all other spaces being closed by the overlapping relation of the stator and rotor blades. This gate space is now in alignment with the space I of the rotor blade 225 which connects with the channel 240 leading to the second mixer stage of the structure which is formed by the stator 176 and the rotor 186, as shown in Fig. 2. The successive movement of the liquid from the chamber 237 into the space 240 follows the same pattern as outlined before in connection with the movement of the liquid from chamber 231 into chamber 237.

The action resulting from the operation described above maintains continuity of the liquid, at the same time subjecting the liquid to centrifugal and maximum shearing forces which are believed to be beneficial for the mixing operation, and cutting down choping forces which would result in a different arrangement of the rotor-stator blades, for example, in an arrangement providing for equal division of the tangential slots in the rotor as well as in the stator rings. Another point to be considered in connection with this structure resides in the provision of the chambers 231 and 237 between the rotor blade rings and the adjacent stator blade rings. These chambers equalize the pressure resulting from the operation of the rotor blades and thus contribute toward maintaining the continuity, and therewith the control, over the fluid stream. The configuration of the rotor-stator blades and the resulting coaction provides likewise for the continuous and even propulsion of the liquid.

The above described operation applies when the rotor faces are axially in close proximity with respect to the stator faces. The material will then be subjected to a combination of shearing and pressure forces. The mechanism will also act to propel the liquid laterally outwardly in a steady controlled stream which is constantly subjected to shearing and pressure forces. The innermost rotor blade rings operate in the nature of a centrifugal pump and adapt the structure for use as a self-contained unit which performs the pumping action and takes care of the feed of the material stream to be processed.

The combination of forces as outlined above is desirable in connection with the treatment of many materials and it may not be necessary with other materials. The present unit has been designed as an all-purpose machine suitable for the treatment of different materials. Therefore, a large latitude of adjustment in the relation of the rotor-stator faces is provided, measuring from a very close adjustment of a few microns up to about ¼", as previously mentioned. As the distance between the rotor-stator faces is increased the shearing and pressure forces described above are lessened and the outwardly effective centrifugal forces are increased. The impeller action of the rotor blades 224 is increasingly added to that of the innermost rotor blades 223. Therefore the amount of material that can be moved through the mixer stage is greater with increasing spacing between the rotor-stator faces, but the pressure and shearing forces may be increased with close adjustment. A medium adjustment will provide for a churning turbulence. Very wide adjustment will mainly furnish a turbulent continuous flow.

For the reasons outlined above, the mechanism can be used to provide a processing treatment similar to that known from ordinary colloid mills, with such improvements that result from the new structure, and also to provide mixing agitation for large amounts of material moved therethrough, and, finally, a turbulent flow for feeding material into the upper tank.

The pipe 127 shown in Fig. 2 connects with the valve 130 shown in Fig. 1 which in turn is connected with the pressure and temperature measurement instruments 132–133. The pressure and temperature conditions at this critical point, namely, the first mechanical mixing stage, can thus be checked during operation.

Fig. 4, which is a section through the mixer unit shown in Fig. 2 along lines 4—4 thereof, shows the various parts in substantialy the same relationship as explained in connection with Fig. 3, except that these parts apply to stator 176 and rotor 186. The view is looking down on the stator 176, the blades being shown in elevation, vertically shaded, and the rotor blades appearing in section and cross-hatched. The flow of liquid to be processed in this mechanical mixer stage proceeds perpendicularly upwardly from the plane of the drawing, Fig. 4, on top of the rotor 185 which is underneath this stage. The liquid is scooped up by the innermost rotor blades and is subjected to the action of the radially outwardly successive rotor-stator blades exactly in the same manner as explained in connection with Fig. 3. The flow of the liquid does not need to be repeated here in detail.

This mixer stage is provided with a pipe 128 (see Fig. 2) connecting with the instruments 132—133 shown in Fig. 1, so as to permit checking of the temperature and pressure conditions during operation.

Fig. 5 is a sectional view of a modified rotor conforming to the view shown in Fig. 3. Fig. 6 is a view of the stator coacting with the rotor shown in Fig. 5, conforming to the view of the stator shown in Fig. 4. Fig. 7 is a sectional view showing the essential parts of this modified embodiment of rotor and stator and the coaction thereof on a larger scale.

Referring now to these figures, it will be seen that the modified rotor is equipped with two blade rings corresponding to the innermost blade rings in the previous embodiment. The outermost blade ring, however, is omitted and instead there is provided an annular peripheral toothed or suitably serrated portion indicated at 260. The stator, Fig. 6, is provided with a peripheral toothed or serrated portion 261 for coaction with the portion 260 of the rotor. The teeth or serrations may be of any desired type, in the form of gear teeth, spiral teeth, or preferably spiral serrations of the general type used in flour mills.

The processing by the use of the modified rotor-stator assembly shown in Figs. 5-7 proceeds substantially along the same lines as explained in connection with the previous embodiment. The provision of intermediate laterally successive chambers between the rotor-stator blades is particularly apparent from Fig. 7, an intermediate chamber in this figure being indicated by the numeral 262. The material flows during processing along the lines of the spaces 263—264—265, providing shearing by-passes, and the liquid being propelled, as previously explained, by the rotor blades coacting with the stator blades. The liquid finally arrives at the chamber 267 and is then subjected to a final processing step between the coacting serrations 260 and 261 of the rotors and stators. The liquid moves from the final processing step of this mixer stage upwardly through the channel 268 in the direction of the arrow.

The mixer unit shown in Fig. 2 may be mounted for up-flow operation, as shown in Fig. 1, or for down-flow operation, and in the latter case the tank such as 112 is, of course, provided underneath the mixer unit.

The machine disclosed herein will be found useful for processing many materials, for example, homogenizing of milk, processing of food products, preparation of bituminous emulsions, chemical and pharmaceutical preparations, and also in the mixing of a coal oil fuel commonly referred to as colloidal fuel.

The invention may be used and changes may be made within the scope and spirit of the following claims.

I claim:

1. A mixer of the colloid mill type comprising a stator carrying a plurality of concentric annular rings each forming a plurality of axially disposed blades, a rotor carrying a plurality of concentric annular rings each forming a plurality of axially disposed radially spaced blades for coacting interlacing relationship with said stator blades, means connected with said stator and forming a stationary annular toothed ring peripherally thereof which is radially spaced from the outermost stator ring, and a toothed annular peripheral ring carried by said rotor for coaction with said stationary toothed ring.

2. A mixer of the colloid mill type comprising a stator carrying a plurality of concentric annular rings each forming a plurality of annularly disposed axially extending blades, a rotor carrying a plurality of concentric annular rings each forming a plurality of annularly disposed radially spaced blades for coacting interlacing relationship with said stator blades, means associated with said stator and forming an annular toothed ring peripherally thereof which is radially spaced from the outermost stator ring, and a toothed ring carried by said rotor for coaction with the toothed ring associated with said stator.

3. A mixer of the colloid mill type, for processing fluid materials, comprising a stator body and a rotor body, a predetermined number of arcuate blades of a greater angular length than width formed on said stator and said rotor body, respectively, which are disposed annularly thereon and extend axially therefrom in mutually interlacing relationship, the number of blades on said rotor body being greater than the number of blades on said stator body to form responsive to rotation of said rotor body relative to said stator body by successive radial alignment of the space between two adjacent rotor blades with angularly successive spaces between angularly successive stator blades radially operatively successive passages for the movement of the material to be processed, means extending from said stator body and forming an annular toothed ring peripherally thereof, and a toothed annular ring carried by said rotor body for coaction with said stator ring.

4. A mixer of the colloid mill type comprising a stator carrying a set of concentric annular blade rings each forming a plurality of arcuate axially extending blades, a rotor carrying a set of concentric annular blade rings each forming a plurality of arcuate blades for coacting interlacing relationship with said stator blades, means associated with said stator and forming an annular toothed ring which is radially spaced from the set of annular blade rings carried thereby, and a toothed ring carried by said rotor for coaction with the toothed ring associated with said stator.

5. A mixer of the colloid mill type, for processing fluid materials, comprising a stator body and a rotor body, a predetermined number of arcuate blades of a greater angular length than width formed on said stator and said rotor body, respectively, which are disposed annularly thereon and extend axially therefrom in mutually interlacing relationship, the number of blades on said rotor body being greater than the number of blades on said stator body to form responsive to rotation of said rotor body relative to said stator by successive radial alignment of the space between two adjacent rotor blades with angularly successive spaces between successive stator blades radially operatively successive passages for the movement of the material to be processed, means forming an annular toothed ring on said stator body which is radially spaced from the arcuate blades thereof, and a toothed annular ring carried by said rotor body for coaction with said toothed stator ring.

GEORGE A. AUER.

REFERENCES CITED

The following references are of record in the file of this patent:

UNITED STATES PATENTS

| Number | Name | Date |
|---|---|---|
| 804,012 | Kihlgren | Nov. 7, 1905 |
| 1,235,030 | Higginson | July 31, 1917 |
| 1,451,424 | Head | Apr. 10, 1923 |
| 1,556,927 | Fritz | Oct. 13, 1925 |
| 1,645,847 | Anthony | Oct. 18, 1927 |
| 1,745,727 | Sterzl | Feb. 4, 1930 |
| 1,848,100 | Benner et al. | May 8, 1932 |
| 1,971,314 | Lauenstein | Aug. 21, 1934 |
| 2,221,342 | Butler | Nov. 12, 1940 |
| 2,255,213 | Good | Sept. 9, 1941 |
| 2,321,599 | Hoffmann | June 15, 1943 |

FOREIGN PATENTS

| Number | Country | Date |
|---|---|---|
| 126,854 | Great Britain | May 22, 1919 |